F. G. PECK.
WAVE OR TIDE MOTOR.
APPLICATION FILED APR. 23, 1919.
1,338,326.
Patented Apr. 27, 1920.
2 SHEETS—SHEET 1.
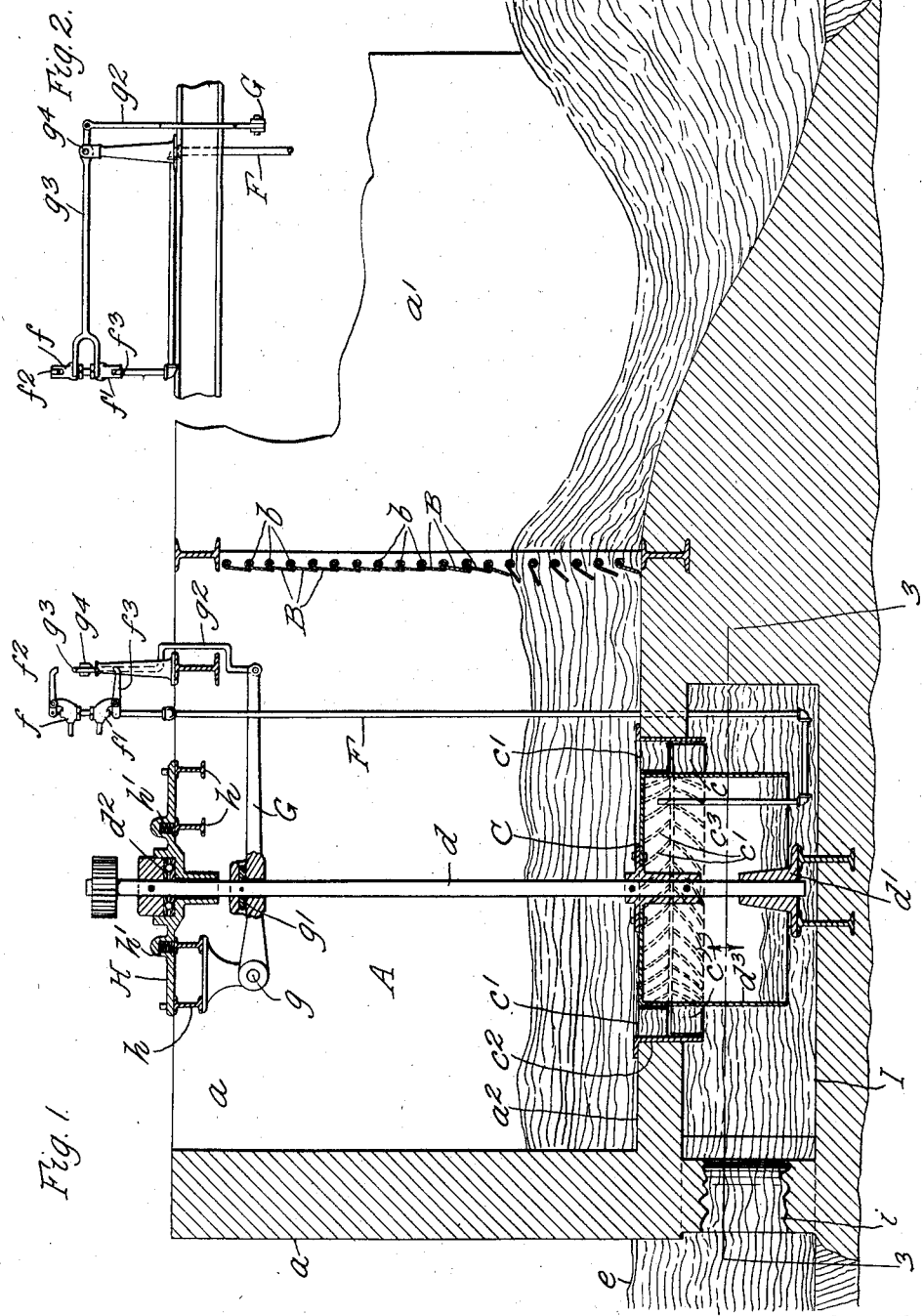
INVENTOR.
Frederick G. Peck.
By Wilhelm & Parker.
ATTORNEYS.

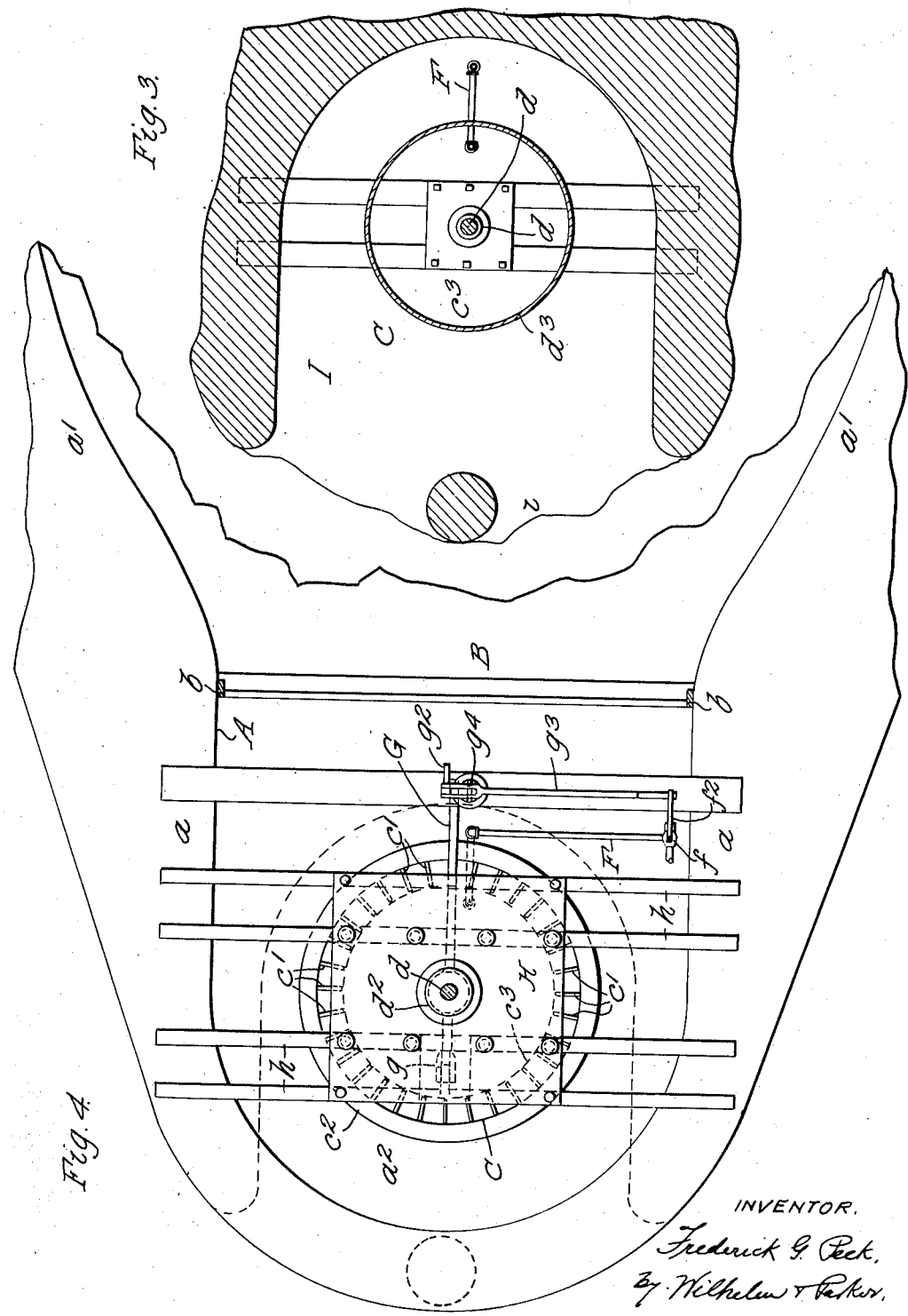

UNITED STATES PATENT OFFICE.

FREDERICK G. PECK, OF BRADFORD, PENNSYLVANIA.

WAVE OR TIDE MOTOR.

1,338,326.   Specification of Letters Patent.   Patented Apr. 27, 1920.

Application filed April 23, 1919. Serial No. 292,216.

*To all whom it may concern:*

Be it known that I, FREDERICK G. PECK, a subject of the King of Great Britain, residing at Bradford, in the county of McKean and State of Pennsylvania, have invented a new and useful Improvement in Wave or Tide Motors, of which the following is a specification.

This invention relates to apparatus for deriving power from waves, tides, or the like.

The objects of the invention are to provide an apparatus of this kind in which means are provided for greatly reducing the friction of the movable parts; also to provide means of improved construction for automatically controlling the buoyancy of the movable part of the water wheel in accordance with changes in the head of water acting on the movable part; also to improve the construction of devices of this kind in other respects hereinafter specified.

In the accompanying drawings:

Figure 1 is a longitudinal sectional elevation of an apparatus embodying the invention.

Fig. 2 is a fragmentary front elevation of the air valve actuating mechanism of the apparatus.

Fig. 3 is a fragmentary sectional plan view thereof on line 3—3 of Fig. 1.

Fig. 4 is a top plan view thereof.

Briefly stated, the apparatus embodying the invention which is shown in the drawings, includes a basin or reservoir provided with means for receiving water and in which a supply of water is maintained by wave action at a higher level than the normal water level, a water wheel of a construction which is adapted to operate at a low head of water, and means for varying the buoyancy of the rotating part of the water wheel so as to reduce the friction which would result from the weight of the rotary part and of the varying weight of the water exerting pressure on the water wheel.

A represents a basin or reservoir which is preferably formed by means of walls $a$ formed of concrete, masonry or other material adapted to resist the force of the waves and which have outwardly extending diverging portions $a'$ which are formed to direct or concentrate the waves toward the basin A. The front or outer wall of the basin is preferably formed in such a manner as to permit water to enter the basin and to prevent the water from flowing out of the basin. In the construction shown, this front wall is formed of a plurality of hinged plates B pivoted at $b$ in the opposite side walls $a$ of the basin and arranged so that the outer or free ends thereof will engage the upper portions of adjacent plates. The force of a wave against the plates B will cause the plates to swing on their pivots as shown in Fig. 1, and permit the water to freely enter into the basin. When the wave recedes, the plates will swing, by gravity and by the action of the water within the basin, into their closed positions in which the lower end of each plate bears against the upper portion of the adjacent plate and forms a closure therewith. Any other means for permitting the water to enter into the basin and preventing its flowing out of the same may be provided.

The basin A is provided with a bottom $a^2$ in which a water motor or turbine C is arranged. This motor includes a rotary member which is provided with the usual vanes $c$ arranged below and adapted to coöperate with fixed vanes $c'$ which, in the construction shown, are formed on or secured to an annular plate or frame member $c^2$ secured to the bottom $a^2$ of the reservoir. The stationary and rotary vanes may be of any usual or suitable construction and the rotary member is preferably made in the form of a drum or barrel $c^3$ which is rigidly secured to an upright shaft $d$. The lower end of this shaft is journaled in a bearing $d'$ arranged in the base or foundation of the apparatus and the upper end of the shaft is provided with a suspension or thrust bearing $d^2$ of any suitable kind.

Owing to the fact that the height of water in the basin A is only slightly above the normal water level indicated at $e$, the diameter of the rotary part of the water turbine must be comparatively large so that a great weight of water is supported on the rotary drum or barrel $c^3$. In order to avoid the excessive friction which would result from the weight of the water on the rotary part of the turbine, the following means are preferably provided for relieving the suspension bearing $d^2$ of this weight:

The rotary barrel or drum $c^3$ is provided with an annular wall $d^3$ and the bottom of the drum or barrel is open. By permitting air to enter into the inverted drum or barrel $c^3$, the weight of the water above the drum may be counteracted by the buoyancy of the drum produced by the air therein.

Owing to the fact that the head of water in the basin A may vary with waves of different height, means are preferably provided for varying the amount of air within the barrel $c^3$. This is accomplished by means of an air pipe F which extends below the lower edges of the side wall of the barrel and upwardly into the same, the pipe terminating in proximity to the upper end of the barrel. The amount of air in the barrel may be controlled by means of an air admission valve $f$ and an air discharge valve $f'$ having actuating handles or levers $f^2$ $f^3$ respectively. In order to control the quantity of air in the barrel $c$ automatically in accordance with he head of water in the basin A, the following valve actuating mechanism is preferably employed:

The shaft $d$ is movable vertically to a limited extent and the movement of the shaft is communicated by means of a collar $g'$ or the like to a lever G pivoted at $g$. The end of the lever G is pivotally connected to a link $g^2$, the upper end of which is pivoted to a lever $g^3$ fulcrumed at $g^4$. The end of the lever $g^3$ is adapted to engage the handle $f^3$ of the valve $f'$ when the shaft $d$ rises—owing to an excess of air in the barrel $c^3$. This causes the valve $f'$ to be opened to discharge air from the barrel. If the shaft $d$ moves downwardly owing to the weight of water upon the barrel, the lever G will move downwardly, causing the lever $g^3$ to move upwardly so that the end thereof engages with the actuating arm $f^2$ of the valve $f$. This valve is preferably connected to a supply of compressed air (not shown) so that the actuation of the arm $f^2$ will cause the air under pressure to be admitted into the barrel $c^3$ to increase the buoyancy thereof.

Any suitable means may be provided for mounting the shaft $d$ so as to permit the same to move vertically through a limited distance in order to effect the controlling of the air valves. In the construction shown for this purpose, the suspension bearing $d^2$ is arranged in a plate or base H which is supported from beams or other suitable support $h$, the ends of which rest on the side walls $a$ of the basin. The plate H is preferably supported from the beams $h$ by means of springs $h'$ or other yielding means which permit the necessary movement of the shaft $d$. The levers G and $g^3$ are so arranged that a very slight movement of the shaft $d$ is sufficient to effect the actuation of either valve.

The water discharged from the vanes $c$ of the turbine flows into a discharge flume or space I arranged beneath the bottom $a^2$ of the reservoir and is discharged through a tunnel or passage $i$ formed below the end wall of the reservoir.

By means of the construction described, the friction produced in the bearings of the shaft $d$ owing to the weight of water upon the drum D, may be very greatly reduced, and the variations in the weight of the water acting on the rotary part of the turbine, caused by the difference in the height of the water in the reservoir and the normal water level, can be readily compensated for.

I claim as my invention:

1. In a water turbine, the combination of a rotary member which is pressed downwardly by pressure due to the head of water at the inlet end of said turbine and on which the pressure due to the head of the discharged water acts in an upward direction, and means on said rotary member for confining a quantity of air adapted to counteract the difference in pressure acting on said rotary member.

2. In a water turbine, the combination of a rotary member which is pressed downwardly by pressure due to the head of water at the inlet end of said turbine and on which the pressure due to the head of the discharged water acts in an upward direction, means on said rotary member for confining a quantity of air adapted to counteract the difference in pressure acting on said rotary member, and means for varying the quantity of air in accordance with variations in the head of water at the inlet end of said turbine.

3. In a water turbine, the combination with fixed and movable vanes, a rotary member on which said movable vanes are secured, said rotary member being submerged in water with its upper surface adapted to resist the difference in the pressure of water at the inlet and discharge ends of the turbine, said rotary member having a space adapted to contain air, the buoyancy of which counteracts said difference in pressures.

4. In a water turbine, the combination with movable vanes, a rotary member on which said movable vanes are secured and the upper surface of which is adapted to support the weight of a volume of water, an air chamber rigidly connected with said rotary member and submerged below the water, and means for supplying outside air to said chamber.

5. In a water turbine, the combination with movable vanes, a rotary member on which said movable vanes are secured and the upper surface of which is adapted to support the weight of a volume of water, an air chamber rigidly connected with said rotary member and submerged below the water, said chamber having an opening in its lower portion through which the water can pass into and out of the same, and means for supplying outside air to said chamber.

6. In a water turbine, the combination with fixed and movable vanes, a rotary member on which said movable vanes are secured and which supports the weight of a volume of water, an air chamber rigidly connected with said rotary member and submerged below the water, and means controlled by the weight of water supported by said rotary member for supplying a varying amount of air to said chamber.

7. In a water turbine, the combination of stationary vanes, a rotary member provided with vanes adapted to coöperate with said stationary vanes, said rotary member supporting a quantity of water, a receptacle connected with said rotary member and submerged, and means controlled by the weight of the water supported by said rotary member for varying the buoyancy of said receptacle to counteract the weight of the water.

8. In a water turbine, the combination of stationary vanes, a rotary member provided with vanes adapted to coöperate with said stationary veins, said rotary member supporting a quantity of water, an air receptacle connected with said rotary member and submerged, a passage for supplying air to and removing air from said receptacle, and valves for controlling the quantity of air in said receptacle, said valves being controlled by the weight of the water on said rotary member.

9. In a water turbine, the combination of stationary vanes, a rotary member provided with veins adapted to coöperate with said stationary vanes, said rotary member supporting a quantity of water, an air receptacle connected with said rotary member and submerged, a passage for supplying air to and removing air from said receptacle, valves for controlling the quantity of air in said receptacle, and mechanism actuated by the buoyancy of said rotary member for controlling said valves to vary the amount of air in said receptacle.

10. In a water turbine, the combination of stationary vanes, a rotary member provided with vanes adapted to coöperate with said stationary vanes and which rotates about a substantially upright axis, said rotary member supporting a quantity of water and having an air chamber, a passage through which air may pass into or out of said air chamber, a valve controlling said passage, a lever connected with said rotary member and with said valve and actuated by the vertical movement of said rotary member to actuate said valve.

11. In a water turbine, the combination of stationary vanes, a rotary member rotating about a substantially upright axis and having vanes coöperating with said stationary vanes, a shaft on which said rotary member is secured, a bearing for said shaft adapted to sustain the weight of said rotary member, means for yieldingly supporting said bearing to permit said shaft to move vertically, an air chamber connected with said rotary member, and means for controlling the amount of air in said chamber in accordance with movements of said shaft.

12. In a water turbine, the combination of stationary vanes, a rotary member rotating about a substantially upright axis and having vanes coöperating with said stationary vanes, a shaft on which said rotary member is secured, a bearing for said shaft adapted to sustain the weight of said rotary member, means for yieldingly supporting said bearing to permit said shaft to move vertically through a short distance, an air chamber connected with said rotary member, a valve for controlling the amount of air in said chamber, and a lever connected with said valve and actuated by the vertical movement of said shaft to control the amount of air in said chamber.

13. In a water turbine, the combination of stationary vanes, a rotary member of substantially inverted barrel-shape having vanes adapted to coöperate with said stationary vanes, and means for forcing air into or discharging air from said barrel-shaped member to vary the buoyancy thereof.

14. In a wave motor, the combination with a basin, means for admitting water into said basin and for preventing the discharge thereof, a water turbine through which water from said basin is discharged and which has a rotary member, said turbine being arranged in the bottom of said basin, an air chamber connected with said rotary member, said rotary member being movable vertically, and means actuated by the vertical movement of said rotary member for admitting air to or discharging air from said chamber.

15. In a wave motor, the combination with a basin having vertical side walls, a wall at one side of said basin which admits water into said basin and prevents water from flowing out of said basin, oppositely disposed vertical diverging walls extending outwardly from said basin and forming a continuation of said side walls thereof for deflecting water into said basin, and a water motor driven by the water accumulated in said basin.

16. In a water turbine, the combination with fixed and movable vanes, a rotary member on which said movable vanes are secured, said rotary member being submerged in water with its upper surface adapted to resist the varying differences in the pressure of water at the inlet and discharge ends of the turbine, said rotary member having a space adapted to contain air, the buoyancy of which counteracts said varying differences in pressures, and means for varying the quantity of air in said space.

17. In a water turbine, the combination with movable vanes, a rotary member on which said movable vanes are secured and the upper surface of which is adapted to support the weight of a volume of water, an air chamber rigidly connected with said rotary member and submerged below the water, means for conducting a supply of air to said chamber, and means for controlling said supply of air in said chamber.

18. In a water turbine, the combination with movable vanes, a rotary member on which said movable vanes are secured and the upper surface of which is adapted to support the weight of a volume of water, an air chamber rigidly connected with said rotary member and submerged below the water, said chamber having an opening in its lower portion through which the water can pass into and out of the same, means for conducting a supply of air to said chamber, and means for controlling said supply of air in said chamber.

Witness my hand, this 18th day of April, 1919.

FREDERICK G. PECK.

Witnesses:
J. J. GLEASON,
EVA DAILEY.